June 25, 1929.                C. G. WATSON                1,718,505
                        SPRING JOINT FOR FOLDING RULES
                            Filed Feb. 3, 1922
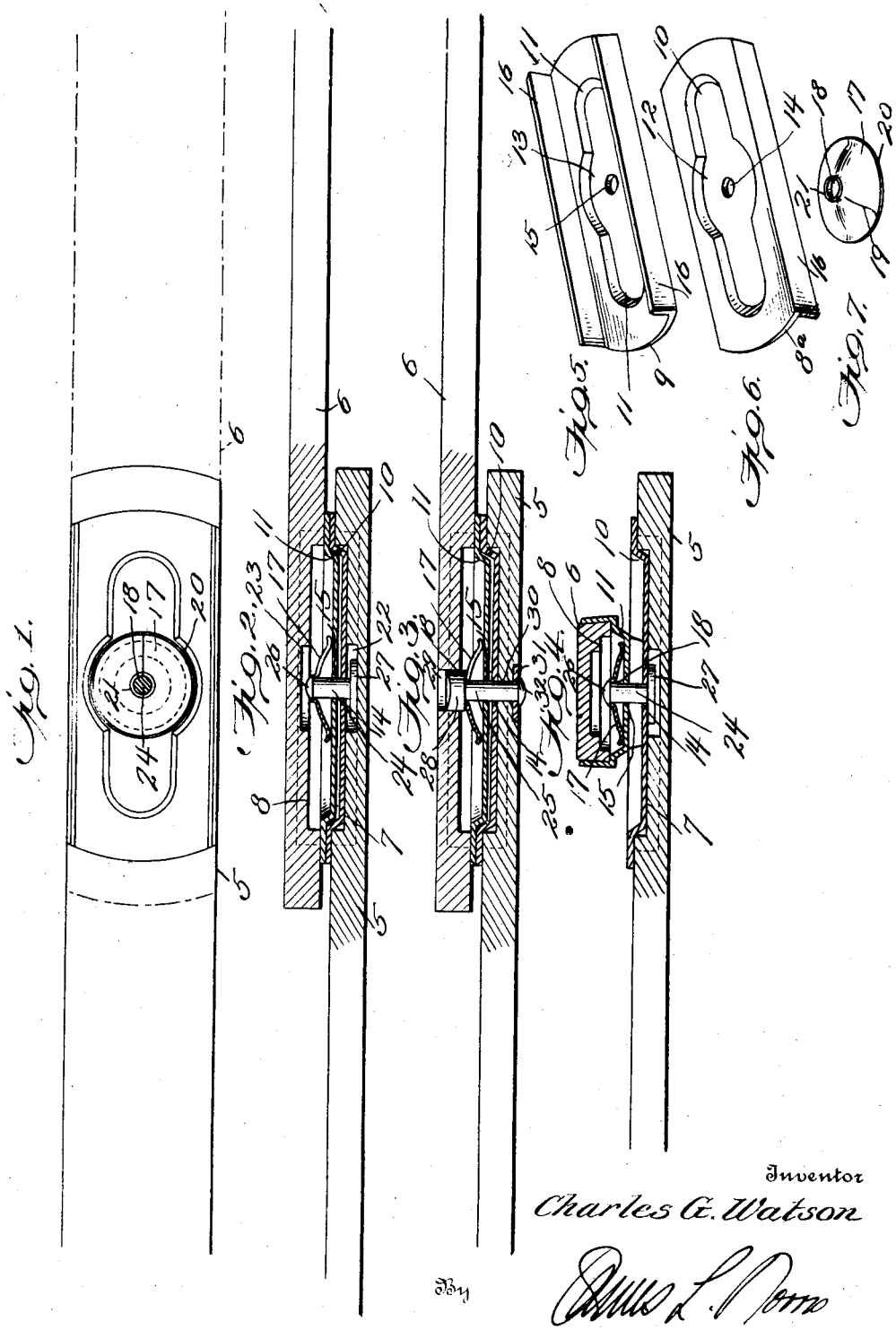
Inventor
Charles G. Watson
By
Attorney Patented June 25, 1929.

1,718,505

UNITED STATES PATENT OFFICE.

CHARLES G. WATSON, OF SENECA FALLS, NEW YORK, ASSIGNOR TO WESTCOTT RULE COMPANY, INC., OF SENECA FALLS, NEW YORK, A CORPORATION OF DELAWARE.

SPRING JOINT FOR FOLDING RULES.

Application filed February 3, 1922. Serial No. 533,862.

This invention relates to folding rules comprising a series of sections terminally overlapped and jointed or connected by hinge plates or members pivotally associated and engaged by frictional springs.

In folding rules of the so-called spring joint or zigzag type as heretofore constructed the weak points usually consisted of the pivot pins or studs and the springs interposed between the parts of the joints and especially the spring, in view of the length of the latter or projection in opposite directions from a central pivot pin or stud engaging portion, the extended parts of these springs being always liable to fracture or breakage and also requiring care in the formation and delicacy of operation in tempering the parts thereof.

The object of the present improved folding rule joint is to overcome the structural weaknesses of the springs by interposing between the parts of each joint and around the pivot pin or stud a circular or round spring of a dished or cupped form, and whereby the resilient resistance to loose movement of the terminally overlapped and jointed sections of the rule will be positive and strong and durable. The improved circular or round spring embodying the features of the present improvement is sensitively resilient or is quick to respond to pressure and expansion, and on the contrary will resume its normal contour and have a more lasting resilient or spring action than can be obtained by the use of a spring with opposite projecting extremities and a weakened central portion. By dishing or cupping the improved spring it is given a firm bearing and placement relatively to a seat therefor formed in one of the hinge plates or members.

The invention specifically consists in the construction and arrangement of the several parts which will be hereinafter described and claimed in preferred form.

In the drawing:

Fig. 1 is a plan view of one extremity of a rule section embodying the features of the invention with the head pivot removed and showing the cooperative rule section extremity in dotted lines;

Fig. 2 is a longitudinal vertical section through the center of the joint extremities of sections of a folding rule embodying the features of the invention;

Fig. 3 is a view similar to Fig. 2, showing a slight modification in the arrangement of the pivot stud or pin;

Fig. 4 is a longitudinal vertical section through the extremity of one section of a folding rule and a transverse section through a cooperating extremity of a rule section which has been turned on the former section and illustrating the action of the parts under tension;

Figs. 5 and 6 are detail perspective views of the hinge plates or joint members which are attached to the extremities of the rule sections; and Fig. 7 is a detail perspective view of the improved form of spring.

The numerals 5 and 6 designate adjoining end portions or extremities of two rule sections of a folding or zigzag rule, said section extremities being respectively formed with recesses 7 and 8 in their opposing faces to receive the parts of the joint members. It will be understood that the extremities of the rule sections are overlapped as clearly shown by Figs. 2 and 3, and said extremities also have hinge plates 8ª and 9 secured thereto, said plates being of the form particularly shown by Figs. 5 and 6. The plate 8ª has a depression 10 therein opposed to and fitting in the recess 7 of the extremity 5 of the rule section to which it is applied and so arranged that it will practically cooperate with and receive a correspondingly shaped depression 11 in the other hinge plate 9, the dimensions of the two depressions 11 and 10 being such that the former will readily slip into the latter, or operate as a projection to engage the depression 10, when the extremities 5 and 6 of the rule sections are disposed in longitudinal relation either in open or closed positions. The depressions 10 and 11 extend longitudinally of their respective hinge plates 8ª and 9 and each has a central seat designated by 12 and 13. These seats 12 and 13 are disposed in the centers of the plates 8ª and 9, and if they were continued would be circular in form and provide central enlargements of the depressions 10 and 11. Through the centers of what may be termed the bottom portions of the seats 12 and 13 are pivot openings 14 and 15. As in the ordinary folding rule constructions embodying hinge plates of this type, the movement of the extremities of the rule sections to dispose the plates 8ª and 9 at an angle to a longitudinal disposition thereof will effect a movement of the depression 11, for instance, out of the depression 10 against the resistance of a yielding element which usually consists of a spring of some form, the spring in the present improvement constituting the main feature of the invention. These hinge plates 8ª and 9 are usually constructed of sheet metal and the formation of a depression in one face of each plate provides a corresponding projection on the opposite face, the plates also having side flanges 16 to embrace and be secured to the side edge portions of the extremities 5 and 6 over the recesses 7 and 8. Therefore, it will be seen that the projection on the one face of the plate 9 in accordance with the present assemblage, when in engagement with the depression 10 of the remaining plate 8ª provides an effective lock to prevent the rule sections from having loose movement when said sections are fully opened or closed.

The essential feature of the present improvement, as hereinbefore noted, consists of a circular or round spring 17, shown in detail by Fig. 7, the said spring in the present improved form being cupped or dished and applied to and snugly fitted within the seat 13 of the plate 9. The seat 12 of the plate 8ª receives the projection provided by the seat 13 in the plate 9 as an additional locking feature, and when the two plates 8ª and 9 are in a locked position, there will be a close interfit of all of the projecting parts produced by the depression 11, and including the seat 13, relatively to the parts of the depression 10, including the seat 12 in the cooperating adjacent plate 8ª. The circular or round spring 17 has a central opening 18 therein and a radial slot or cut 19 extending from a point near the opening and downwardly and outwardly through the periphery, to give the spring a sensitive resilient action when subjected to compression by the operation of the parts of the rule joint. The body of the spring 17 is of continuous contour, or is not divided or cut at any other point with the exception of the slot or cut 19, so as to give the spring a greater or stiffer resilient action and a stronger or more durable service with less liability to breakage or fracture during the performance of its function with relation to the parts with which it is associated. The peripheral edge 20 of the spring is slightly struck or flared upwardly to provide an easy bearing or contact of the periphery of the spring on the bottom portion of the seat 13 of the hinge plate 9, this bearing contact of the periphery of the spring being uniform fully around the spring. The spring is also formed with a boss 21 around the pivot opening 18, to provide a raised seat for the head of the pivot and also to reinforce the spring at this point. The boss 21 is so shaped that it will eliminate friction to a very large extent between the pivot head and the spring, or the pivot head is held out of contact with relation to the body of the spring by this boss, and as a consequence, there will be an easier and freer movement of the pivot head relatively to the spring. Moreover, the raised boss in addition to its reinforcing function will overcome any weakening of the spring that might otherwise be present as the result of punching the spring to form the pivot opening.

The recesses 7 and 8 respectively formed in the overlapped extremities 5 and 6 of the rule sections have central counter recesses 22 and 23 in the form of the joint shown by Figs. 1, 3 and 4, to give freedom of action of the parts at the centers of the joint members and particularly the spring 17. The plates 8ª and 9 are pivotally connected by a pivot stud or pin 24, as shown by Figs. 1, 2 and 4, and by a slightly different form of pivot stud or pin 25, as shown by Fig. 3. The shank of the pivot stud or pin 24 and, likewise, the shank of the stud or pin 25 is passed through the openings 14 and 15 of the plates 8ª and 9 and also through the opening 18 of the spring which is alined with the said openings 14 and 15. The pivot stud or pin 24 has a head 26 which is disposed centrally with relation to the counter recess 23 and engages the boss 21, and on the opposite end of this pivot stud or pin 24 a washer 27 is secured and is normally located in the counter recess 22, as shown by Fig. 2. The pivot stud or pin 25 has a head 28 located or projecting into an opening 29 of the extremity 6 of the one rule section and also bearing on the spring boss 21, as in the structure shown in Figs. 2 and 4. The shank of the pivot stud or pin 25 also passes through an opening 30 of the extremity 5 of the opposing rule section and is engaged by a washer 31 against which the end of the shank of the pivot stud is upset or swaged as at 32. In the form of the joint shown by Fig. 3 the counter recesses 22 and 23 are omitted and Figs. 2 and 3 show the usual two forms of rule joints, or the one having the concealed stud or pivot and the other a pivot stud or pin which penetrates or extends through the rule section extremities. The operation of both forms of the rule joint is similar.

The circular or round spring 17 resists loose movement of the one rule section extremity relatively to the other when the two extremities are opened so as to separate the projection formed by the depression of one hinge plate from the depression of the remaining hinge plate, and under these conditions the spring is compressed as clearly shown by Fig. 4, and all the spring action is directly in the center of the joint, or at a point where the greatest resistance to loose movement is necessary. When the extremities of the rule section are disposed as shown by Fig. 4, the washer 27 on the one end of the shank of the pivot stud or pin 24 shifts or is drawn towards the adjacent hinge plate and the circular spring is maintained in its seat in the opposing hinge plate, but spreads under compression tension so as to keep the hinge plates in reasonably tight engagement during the angular positions of the extremities 5 and 6 of the rule sections, or during the time that the said sections are shifted from closed to open position, and vice versa.

The circular or round cupped spring 17, which forms the essential feature of the present invention, is obviously devoid of all projecting spring arms or parts that are liable to become fractured. The specific form of this spring is materially advantageous in that a strong resilient action necessary to maintain the rule sections in reasonably tight association at their jointed ends is provided in contradistinction to a deterioration in the spring action and fracture of the springs heretofore commonly employed, and wherein the springs have a shifting movement and soon lose their necessary resilient tension. It will also be seen that the entire peripheral edge of the spring bears on the bottom of the plate or of the seat 13 in which the spring is mounted, and in the compression of the spring the latter flattens regularly in all radial lines thereof. The spring 17 exerts its resilient tension centrally with relation to the joint, and when under compression, it equally expands in all radial directions, and moreover, when the spring is permitted to return to its normal position it uniformly contracts, thus concentrating the force of the spring at all times at the vertical center of the joint and of which the stud 24 forms the axis.

The improved rule joint structure, including the specific form of circular or round spring will be found exceptionally advantageous in its operation and durability, particularly in view of the fact that there are no projecting spring extremities that are liable to become broken or fractured.

What is claimed as new is:

1. A rule joint comprising a pair of rule sections, a pair of hinge plates individually secured to adjacent side portions of said rule sections and the one plate having a projection and the other a depression for interlocking operation and formed by stamping the same on the plates, the plates also having perforations, a circular cupped spring interposed between, and enclosed by, one of the plates and the adjacent portion of one of the rule sections and having its base bearing upon the bottom of the depression of the plate in which it is mounted, the bottom of the spring adjacent the peripheral edge portion thereof uniformly bearing on and constantly held against the bottom of the recess of the plate in which it is mounted, and a pivot stud passing through the perforations of the plates and the spring and having a headed end bearing on the apex of the spring and concealed between the latter and the rule section next above, the resilient action of the spring being concentrated solely at the centers of the plates and on the joint around the pivot stud.

2. A rule joint comprising a pair of rule sections, a pair of hinge plates secured, respectively, to adjacent side portions of said rule sections, one plate having a projection on one face and a depression on its opposite face and the other plate having a depression for interlocking operation with the projection on the first named plate, the plates also having perforations therethrough, a circular spring interposed between the first-named plate and the rule section by which said plate is carried and enclosed by the depression of said plate, the periphery of said spring being upstruck and forming a circular convex portion on the lower face of said spring to uniformly bear against the bottom of the depression of the plate in which it is enclosed, the spring being of substantially conical contour and having an opening in its apex and a single radial cut extending from its periphery to a point at a distance from said opening, the remaining portion of the spring being free of cuts or openings, and a pivot stud passed through the perforations of the plates and the opening of the spring and exerting compression on the apex of said spring.

In testimony whereof I have hereunto set my hand.

CHARLES G. WATSON.